Figure 1:
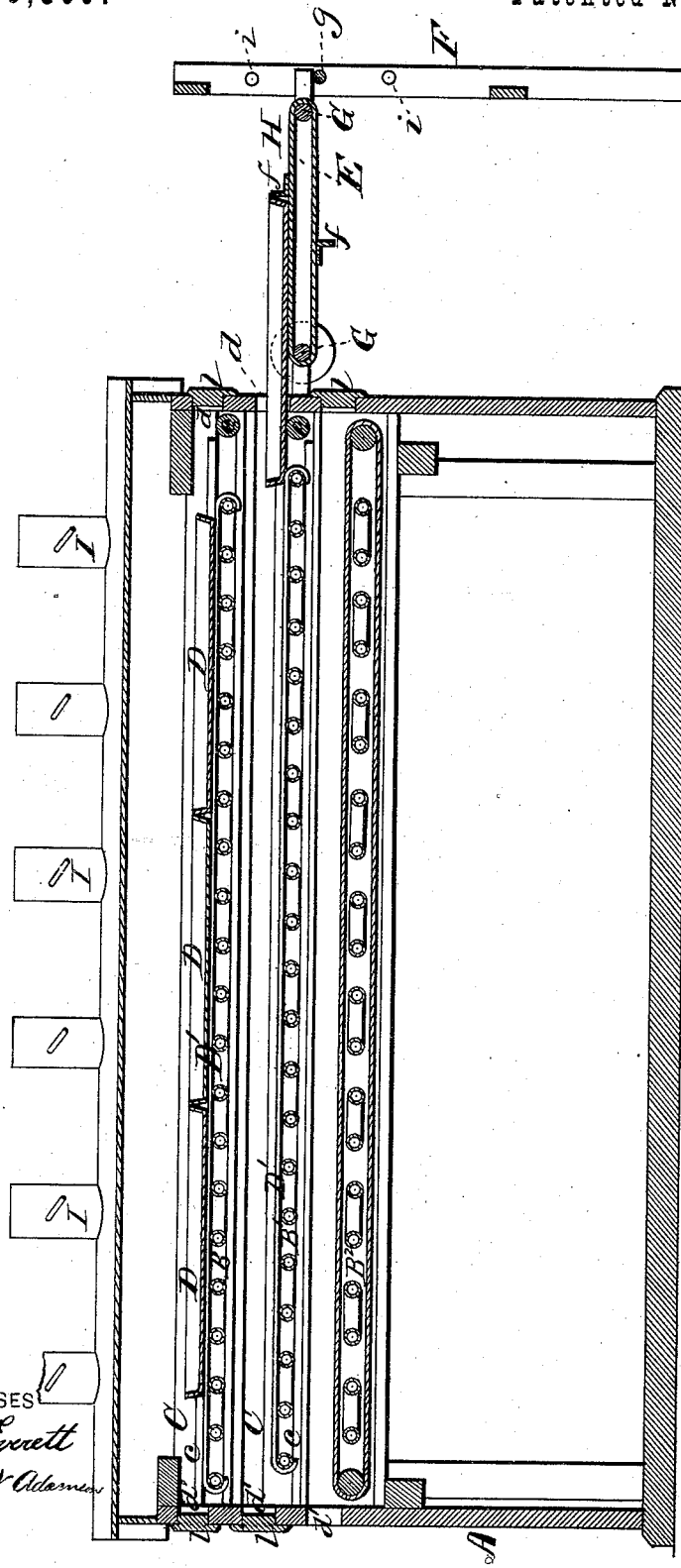

3 Sheets—Sheet 1.

T. WEBBER.
DRYING APPARATUS.

No. 169,500. Patented Nov. 2, 1875.

WITNESSES
Robert Everett
Eugene W. Adams

INVENTOR
Thos. Webber.
Chipman
Hosmer & Co
ATTORNEYS

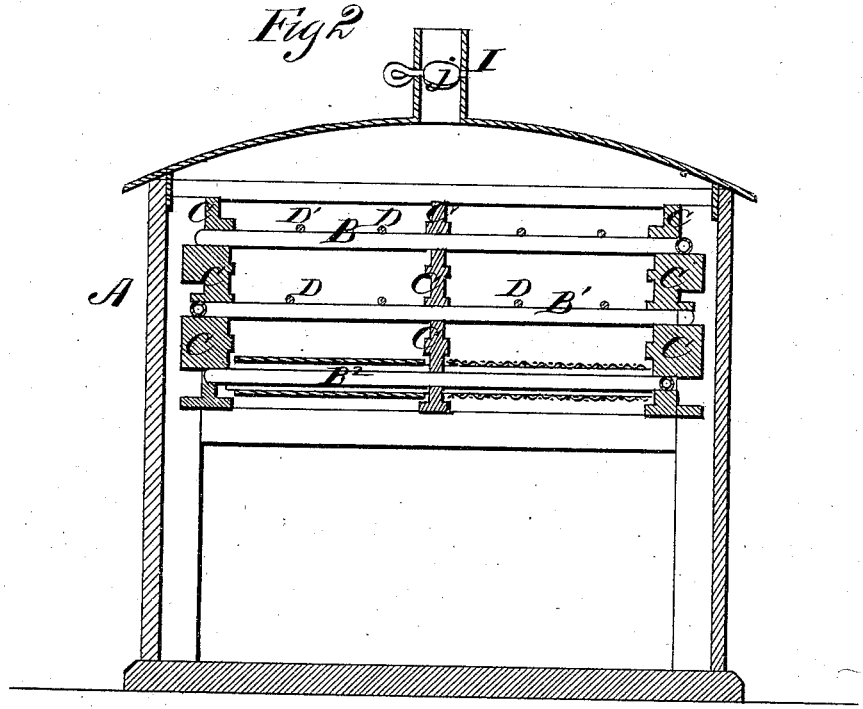

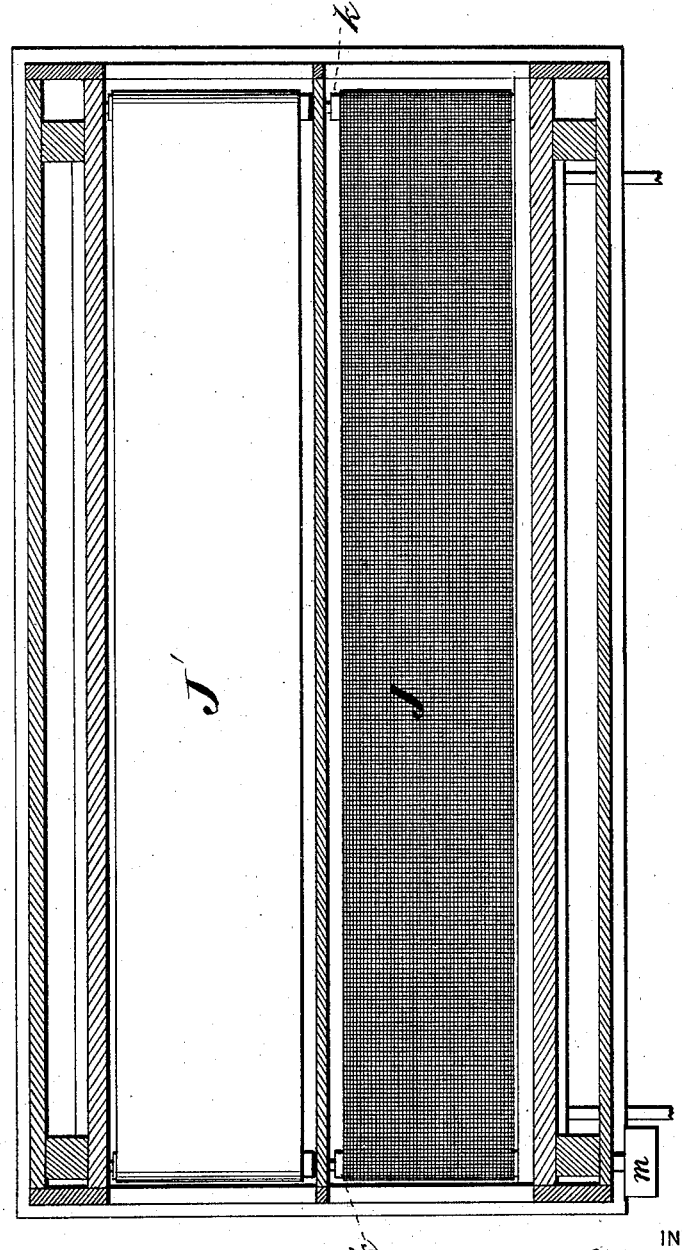

UNITED STATES PATENT OFFICE.

THOMAS WEBBER, OF CHICAGO, ILLINOIS.

IMPROVEMENT IN DRYING APPARATUS.

Specification forming part of Letters Patent No. 169,500, dated November 2, 1875; applicated filed September 18, 1875.

*To all whom it may concern:*

Be it known that I, THOMAS WEBBER, of Chicago, in the county of Cook and State of Illinois, have invented a new and valuable Improvement in Apparatus for Treating and Drying Animal Matter; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my kiln; and Fig. 2 is a transverse vertical sectional view of the same. Fig. 3 is a horizontal sectional view thereof.

This invention has relation to improvements in kilns for drying animal manner, generally, previous to the process for converting it into a fertilizing compound; and it consists in the arrangement and novel construction of the various devices used, whereby most useful and labor-saving results are obtained, as will be hereinafter more fully explained and claimed.

In the annexed drawings, the letter A represents the outer casing of my improved drier, which casing is preferably of brick-work, and is crowned by a top of curved form, which may also be of masonry; but which I preferably make of metal made incapable of conducting heat by a suitable non-conducting compound. This outer casing is heated by means of two or more spaced steam-coils, B B$^1$ B$^2$, which communicate the one with the other by means of suitable couplings, and which radiate heat into the interior of the drier, when they are charged with steam from a suitable boiler. These coils are kept apart, and are supported in a horizontal position by means of ways C, which are provided with guide-strips $c$, upon and between which drying-pans D of any suitable metal are adapted to be placed; also with metallic rods D$^1$ of sufficient rigidity, which extend from end to end of and completely across the pipes in each coil, as shown in figure. These rods are designed, principally, as supports for the pans, resting upon which their bottoms will be prevented from sagging under the weight of their contents, and as distributors, whereby the weight of the pans and contents will, in each tier of steam-coil, be evenly distributed over the whole surface of the coil. The pans are introduced into the interior of the drying-kiln through doors $d$ at one end of each coil, and are removed after passing over the said coil from a door, $d'$, in the other end. This is greatly facilitated by the following simple appliance, to wit: A rectangular frame, E, of suitable construction is supported in a horizontal position by an upright, F. This frame has in each end a roller, G, over which an endless belt, H, passes, and its upper surface is in the same horizontal plane with that of the supporting and equalizing rods D. When a charged pan is placed upon the belt, which is centrally supported by a roller, and it is caused to operate by the rotation of either of the end rollers, the pan will be delivered into opening $d$ upon a roller, $e$, just within the same, until the belt ceases to be in contact with the pan, when the latter will remain in position within the opening until it is thrust into the drier by the next pan placed on the belt. Each pan will thus force its predecessor into the drier until it is filled.

In order to prevent a pan from slipping over the surface of the belt without entering opening $d$, I use a pusher, $f$, rigidly secured across the belt, which will keep the pan in a constant position in relation to the belt, and have the desired effect. Frame E is adapted to be placed in position in relation to each and every one of openings $d$, by rendering its supporting upright F adjustable. This is accomplished by means of a detachable rod, $g$, which supports one end of the frame E, which rod passes through registering-perforations $i$ in the side bars of the supports, and is adapted to be placed in higher or lower perforations $i$, as the necessities of the case may requre.

When the drier is full, openings $d$ will be accurately closed by means of doors $l$, the steam will be then let on, and the process of desiccation commenced.

In order to regulate the heat in the interior of the drier, as well as to let off the vapors of the drying substances, the roof of the drier is provided with a number of flues, I, through which any excess of heat and the vapors will escape into the open air, a damper, $j$, being placed in each flue for the purpose of regulating the same. Pans D are designed to receive blood and other semi-liquid proceeds of slaughter-houses; but when the substances to be dried are barely moist I will use a metallic reticulated endless belt, J, through which heat will freely pass. This belt is operated by means of rollers $k$, over which it passes, and a pulley-wheel, $m$, upon the end of one of them, through a suitable motor, the semi-dried material being delivered upon the belt through a hopper, and allowed to fall off the same, after being dried, into a chute; or in lieu of the belt J of wire-gauze I may use a solid but flexible belt, J', of sheet metal when the substance to be dried is of such a consistency as to drip through the mesh of the wire.

What I claim as new, and desire to secure by Letters Patent, is—

1. In a kiln for drying animal matter the combination of the pans D with the steam-coils B B$^1$ B$^2$ and the supporting and equalizing rods D', substantially as specified.

2. The combination of the transferring-rollers $e$ with the supporting-rods D' and coils B, substantially as specified.

3. The combination of the frame E, having rollers G, and endless belt H with the casing A, having openings $d$ $d'$, and tiers B B$^1$ B$^2$, substantially as specified.

In testimony that I claim the above I have hereunto subscribed my name in the presence of two witnesses.

THOMAS WEBBER.

Witnesses:
WALTER C. MASI,
BRYAN H. MORSE.